Oct. 18, 1966
G. C. WIGGINS ETAL
3,280,233
MANUFACTURING COATED PLASTIC FILM TUBE
Filed Dec. 18, 1964
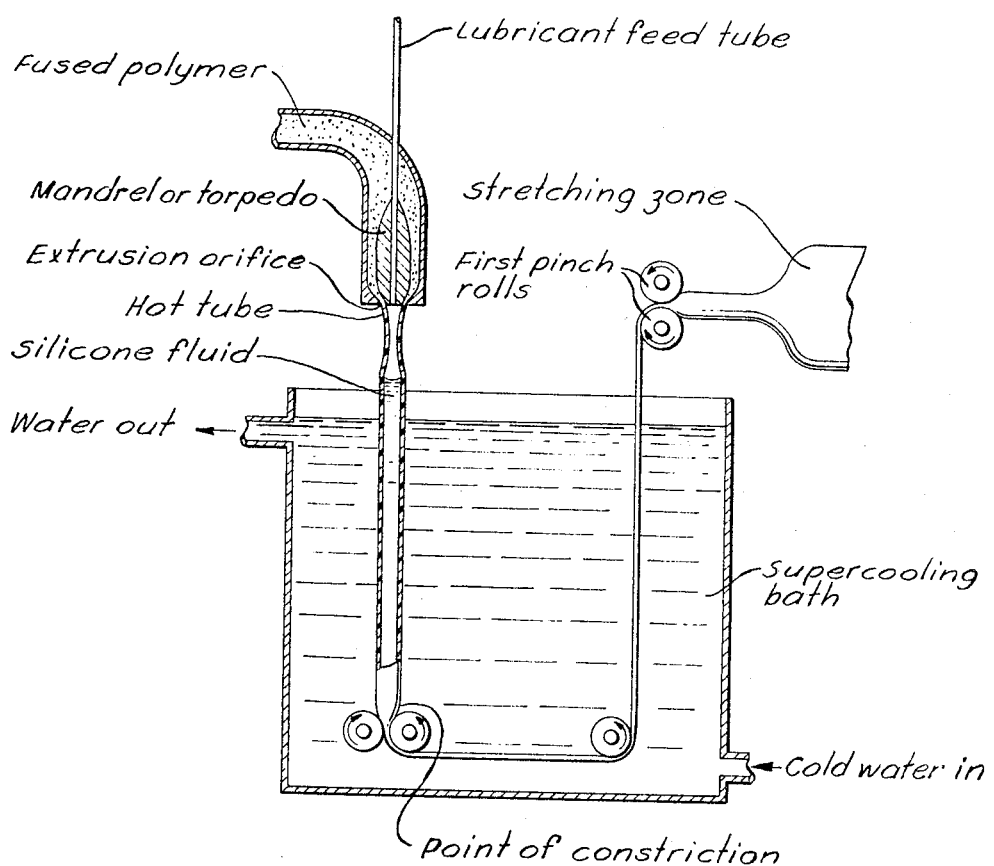
INVENTORS.
Glenn C. Wiggins
Richard A. Frohreich
Claude H. Sweebe
BY  Griswold & Burdick
ATTORNEYS United States Patent Office 3,280,233
Patented Oct. 18, 1966

3,280,233
MANUFACTURING COATED PLASTIC
FILM TUBE
Glenn C. Wiggins, Midland, Mich., Richard A. Frohreich, Boulder, Colo., and Claude H. Sweebe, Midland, Mich., assignors to The Dow Chemical Company, Midland, Mich., a corporation of Delaware
Filed Dec. 18, 1964, Ser. No. 419,454
10 Claims. (Cl. 264—89)

This application is a continuation-in-part of our prior application, Serial No. 116,696, filed June 13, 1961, which is in turn a continuation-in-part of our prior application, Serial No. 847,887 filed October 22, 1959, both of which are now abandoned.

The present invention contributes to the art of manufacturing coated film from thermoplastic resinous materials. In particular, this invention relates to an improved and highly advantageous manufacturing technique for employment in the fabrication of coated product, particularly the metallized varieties of relatively thin film from the normally crystalling polymers and copolymers of vinylidene chloride.

An excellent and extensively practiced procedure for making film from various film forming thermoplastic resinous compositions including the normally crystalline vinylidene chloride (this is Saran) compositions is exemplified in U.S. 2,452,080, U.S. 2,488,571 and U.S. 2,634,459. The so illustrated conventional procedures involve the continuous thermal extrusion of a tube of fused polymer into a temperature regulating bath to supercool the tube. In that bath the tube is flattened between punch rolls or equivalent devices while a column of a liquid is maintained within the freshly extruded tube prior to its flattening. The internal liquid column provides for size control of the hot freshly extruded tube and may also be utilized to assist in cooling of the tube. In addition, the internal column of liquid is frequently relied upon to accomplish lubrication of the interior surfaces of the tube to avoid cohesion of the inner walls after the tube has been flattened prior to subsequent handling such as orientation, slitting, collection, etc.

Generally as described in the mentioned patents a mineral oil or a mixture of mineral oil and water or sometimes glycols is utilized as the liquid constituent in the internal fluid column employed for maintenance of initial tubulation of the freshly extruded plastic film in the temperature regulating bath. The liquid column is frequently known and referred to as a "sock" or especially in the instances when an oleaginous substance such as mineral oil is contained therein as an "oil sock." When conventional procedures using ordinarily employed "oil socks" are followed, however, difficulty may often be encountered in obtaining a film product having an entirely satisfactory surface for many desired subsequent treatments such as metallizing.

When plastic film is metallized (as, for example, by the process disclosed in U.S. 2,665,223, issued January 5, 1954 to P. J. Clough et al.), it is important that its surface be in such a condition that uniform and tightly-adhering receipt of the metallic deposit is readily achieved. This is generally best afforded by use of material having a surface that is scrupulously clean and free from adulterating coatings. If such a condition is impossible to accomplish, it is necessary for any coating on the surface of the film to be of a nature that will not unduly interfere with either the excellence of adhesion or regularity and uniformity of the metal deposit, or with its general appearance, smoothness or other aesthetic characteristics.

In addition, since many film metallizing operations depend on deposition of the metallic layer from a vaporized metal under conditions of extremely high vacuum, it is a practical requirement for the film being metallized to be free from any substantial quantities of surface contaminants that may tend to vaporize or be at all fugacious in such an environment. Trace quantities of mineral oil, water, glycols and so forth are, as is apparent, prone to cause difficulties along the indicated line when they are present on the surface of plastic film being metallized. This may be the case when the film that is involved has been produced by tubulation with a conventional oil sock preceding its orientation by stretching, if desired or necessary, and subsequent slitting to open it to the flat stock that is ordinarily handled in the metallizing operation. Where the film is to be coated on only one side the outer surface (i.e. of the initially formed tube the outward surface of the sock) of the tube may be coated without the oil of the sock adversely affecting the operation. However, where both sides of the film are to be coated, it is prerequisite to a satisfactory product that the coating be uniform on both surfaces.

In order to avoid any possibility of erratic results and rough deposits of metal on plastic film prepared by conventional oil sock tubulation procedures, it has frequently been necessary to wash or scour clean the film product intended to be metallized prior to metallization so that no residual contamination, as of mineral oil, remains on its surface. Oftentimes when oleaginous materials are used in the oil sock a detergent washing step is followed after the tube is slit open to accomplish the desired cleansing. In the cases where Saran film to be metallized is involved and so treated, the washing is attempted prior to any stress relieving (by thermal shrinkage) of the film product. Such a film cleaning operation is, of course, an undesirable requirement in that it occasions additional manipulations and handling and reflects disadvantageously on the cost, due to the extra processing involved, of the washed film product. Besides, the necessity to wash the film in the manufacturing sequence may sometimes seriously hamper the smooth and trouble-free performance of other essential steps in a given process, such as shrinking, splicing and other manipulations. Furthermore, even small traces of water from the washing which may remain with washed plastic film intended to be metallized are extremely difficult to handle and disruptive of desired results in high vacuum metallizing operations.

Printing and coating with inks, resin layers, and so forth are other applications in which, analogous to the requirements for plastic film to be metallized, it is most advantageous and conducive to optimum results to have plastic film with a clean surface or at least in such a condition that no intolerable interference with the desired operation is caused by residual surface deposits on the film from the materials used in the film processing.

It would be advantageous, and it is the principal object of the present invention, to provide a new and improved technique for practice in the manufacture of coated plastic film which is made in a tubulation process using an internal liquid head or column within the freshly extruded tube in the operation thereof whereby the film product is obtained in such a condition that its surface is excellently adapted for the intended receipt or deposit thereon of metallic and other layers, including beneficial plastic and other resinous coatings, printing inks and so forth.

It would be particularly desirable, and, accordingly, it is the primary design of the present invention to provide an excellently qualified and generally better fluid, or class of fluids, for use as the internal liquid head or column in the film tubulation process initially followed in operations of the presently contemplated variety.

The foregoing and related desiderations and objectives are realized and achieved by practice of a technique in accordance with the present invention which involves, in the manufacture of coated plastic film from thermoplastic, resinous, film-forming material in a manner or by a procedure wherein, prior to the final coating operation, a fused, thermoplastic, film-forming composition is extruded downwardly through a tube die into a temperature regulating bath (such as an aqueous supercooling bath) wherein the tube is intermediately flattened or collapsed (as by pinch rolls) while a head or column of a liquid is maintained within the freshly extruded tube prior to its flattening, the use as the liquid in such column of a silicone fluid that is liquid at the temperature of operation of the column (whether or not it is circulated and cooled to assist in temperature regulation of the freshly extruded film or permitted to remain as a non-circulating sock within the tube to come to thermal equilibrium in the system at an elevated temperature between room temperature or that of the temperature regulating bath and the temperature of extrusion). Preferably, the silicone fluid that is employed as the liquid sock in the freshly extruded plastic film tube is one that is normally liquid at ordinary room temperature (i.e., 20–25° C.). Advantageously, as indicated, the silicone fluid sock is utilized in the manufacture of Saran film wherein the freshly extruded Saran tube is passed into a supercooling bath about the internal liquid column prior to being subsequently oriented by stretching, as by an internal distending gas bubble, and slit open to produce a flat or sheet film product. Finally the instant inventive concept comprehends that the surface of the film that was inward of the sock is coated with a metallized or other deposit.

Plastic film, including, in particular, Saran film, manufactured in a process of the described type with benefit, according to practice of the present invention, of an internal silicone fluid sock is obtained as a film product having a surface in excellent condition for receipt of premium quality metal coatings, as regards both physical properties and general appearance, as well as for being coated with other materials, such as plastic and resinous layers, and for being printed with optimum result. Besides, the silicone fluid affords excellent temporary lubrication of the film prior to its coating to protect against its sticking together and being initially flattened in the tubulation process in order to accomplish subsequent orientation, slitting and/or other handling requirements. All this is achieved without any necessity to wash, clean or otherwise treat the film product during its manufacture in order to augment or correct its surface condition for any of the indicated purposes. Furthermore, the inward surface of the film obtained is, as has been indicated, particularly well suited for being metallized with outstanding success under conditions of high vacuum without difficulty due to residues of vaporizable or fugacious materials departing from the surface of the film during the operation to interfere with or disrupt either the vacuum being maintained or the metal vapor intended to be deposited.

The silicone fluids employed as socks in the freshly extruded plastic film tube to be subsequently coated according to practice of the present invention are liquid materials that are polymeric substances comprised of repeating units of the general unit structure and empirical formula:

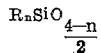

wherein "R" is any monovalent hydrocarbon or halogenated hydrocarbon radical and $n$ has a numerical value between about 1.95 and 2.2, advantageously in the neighborhood of 2. Of course, in homopolymeric materials each repeating unit is identical whereas in copolymeric products two (or more) specifically differing units, all of which fit within the above generic representation, are polymerized together. It is beneficial for the number of carbon atoms in the radical represented by the symbol "R" to be between 1 and about 8 (advantageously 1 to 6) when it is aliphatic in nature and between 6 and about 10 when it is aromatic. Typical of the substituents that may be attached to the silicon atom in the siloxane polymer fluids employed in practice of the present invention are phenyl, chlorinated and hydrocarbon (such as alkyl) substituted phenyl; methyl, chloromethyl, ethyl, chloroethyl and the like alkyl and substituted alkyl substituents; vinyl, allyl, cyclohexanyl; and so forth. Of course, mixed substituents within the above-indicated scope can be employed in siloxane polymers utilized as silicone fluids in practice of the present invention. Advantageously, the monovalent substituent represented by "R" in the siloxane polymer is phenyl methyl, ethyl and mixtures thereof. As is known, liquid siloxane polymers of the described type may be linear in nature or, in some instances, are characterized in having entirely or partially cyclic structures. Either type of configuration may be present in the materials employed in practice of the present invention.

Particular advantage is derived when the silicone fluid is a copolymer of phenyl methyl siloxane units and dimethyl siloxane units containing between about 20 and about 70 mole percent, desirably about 50 mole percent, of the former copolymerized with the latter. Such a polymer may be represented by the structure:

wherein the numerical values of $x$ and $y$ are such that the respective copolymerized units are in the range of the above-prescribed molar proportions. The molecular weight of such a siloxane copolymer product in liquid form containing about equimolar proportions of each polymerized recurring unit in its structure and having a viscosity at 25° C. of about 20 centistokes is about 1100, indicating that there are an average of about 15 polymerized recurring units in each polymer molecule. This somewhat illustrates the extent of ponderosity in the polymer molecules of the siloxane polymers employed as fluids in the practice of the present invention. A 50/50 mole percent phenyl methyl siloxane/dimethyl siloxane copolymer in liquid form having a viscosity at 25° C. of about 30 centistokes has a molecular weight of about 2300. Liquid copolymers of dimethyl siloxane of the general structure:

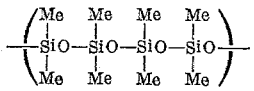

are also especially beneficial for use in practice of the present invention.

While any liquid silicone fluid may be utilized, it is generally desirable to employ these that are normally liquid substances at room temperature, especially those whose viscosity in centistokes at 25° C. is between about 5 and about 100, advantageously between about 10 and 50. A highly beneficial viscosity value for the silicone fluid that is employed is one that is at or closely in the neighborhood of 20 centistokes when measured at 25° C.

Use of a fluid having the proper viscosity characteristics for the conditions under which it is to be employed is a material factor in ensuring greatest benefit from practice of the present invention. Care should be given to the selection since, depending upon the particular combination of siloxane polymer employed in the sock and plastic film being extruded, too thin a fluid may tend to have undesirable solvent action on the polymeric constituent in the film and too thick a film may tend to coat and remain as an excessive residue on the surface of the film product which might, in and of itself, exert some deleterious influence on subsequent metallizing or other coating and printing operations with the film.

The head or column height of the silicone fluid maintained within the tube may be adjusted according to known procedure to best accommodate the processing requirements involved, depending on and in correlation with the particular plastic being extruded, the dimensions of the die orifice used in the tubulation and the speed with which the tube is drawn from the orifice, as well as other conditions of extrusion including the temperature of operation and the character of the temperature regulating bath employed. As is appreciated by those who are skilled in the art, it is generally better to avoid large changes in diameter in the freshly extruded plastic film tube and, to this end, to maintain the head of liquid within the tube at such a level that it does not exceed about 1 or 2 inches of water pressure. In this connection, the liquid head in the silicone fluid sock is usually positive in value, although in some instances it may be desirable to maintain the level of the liquid column within the tube slightly below that of the temperature regulating bath so that there is actually a negative value in the head of liquid in the sock.

As indicated practice of the present invention is particularly useful for manufacture of coated Saran film product, including those plastics of this variety that consist of homopolymers of vinylidene chloride as well as normally crystalline copolymers thereof, as may be determined by X-ray diffraction studies. These include copolymers of vinylidene chloride with vinyl chloride, acrylonitrile and the like that generally contain in the polymer molecule at least about 70 and preferably at least about 80 weight percent of the comonomer (or mixture of comonomers) polymerized with the vinylidene chloride. It is also well adapted for coating, particularly metallizing, of other haloethylene polymers, such as polyvinylchloride, vinyl chloride/vinyl acetate and other vinyl chloride copolymers, and so forth are extruded in tubular form to be subsequently coated in the indicated manner, as well as for such other halogen-containing polymer products as chlorinated polyethylene, chlorinated polypropylene, chlorinated rubber and the like.

The invention as described may be understood with reference to the accompanying drawing, the single figure of which is a partially diagrammatic and partially sectional elevation of an apparatus useful in carrying out the invention showing the extrusion of the tubular film, the location of the desired "sock" and the subsequent flattening of the tube in the supercooling bath.

In a typical specific illustration of the invention, a plastified, crystalline, film-forming copolymer of vinylidene chloride and vinyl chloride that contained about 85 weight percent of vinylidene chloride polymerized in the polymer molecule was fused and extruded at a rate of about 100 pounds per hour at its fusion temperature of about 173° C. through a tube from an orifice having an outside diameter of about 3.50 inches and an orifice opening with a radial thickness of about 0.060 inch. The hot, freshly extruded tube was passed downwardly from the orifice directly into a supercooling bath of water maintained at a temperature in the range from 2° to 7° C. A quantity of a normally liquid siloxane copolymer consisting of about equimolar proportions of copolymerized units of phenyl methyl siloxane and dimethyl siloxane having a viscosity at 25° C. of about 20 centistokes was maintained inside the tube so that its surface was about ¾ inch above that of the cold water bath. The film tube was collapsed and flattened out within the bath, after being withdrawn from the orifice and cooled, between a pair of flattening and withdrawing rolls positioned within the bath so that the total height of the silicone fluid column in the sock was about 10 inches. The silicone fluid in the sock was allowed to be heated to and remain at an equilbrium temperature throughout the extrusion of about 80° C.

Following the initial extrusion and supercooling, the film tube was oriented by stretching using an internal distending air bubble in a known manner (not shown), after which it was slit and opened to produce a double width flat sheet of material having a width of over 50 inches and an average wall thickness of about 0.6 mil (i.e., 60 gauge film). No difficulty was encountered due to sticking of the flattened film tube in the bubble distending orientation step. The slit film was then passed over a series of hot rolls operating at temperatures between about 50 and about 95° C. to shrink the stresses out of the film with the finally obtained product (after trimming) having a width of about 40 inches and a 75 gauge (i.e., 0.75 mil) thickness.

The manufactured Saran film product was then employed in a metallizing operation of the type described in U.S. 2,665,223 wherein the film was silvered on both sides with a deposited layer of aluminum applied as a vapor under a vacuum of about 1 micron. An excellent quality, premium grade product was obtained with a perfectly smooth and uniformly attractive metal coating on both sides.

In addition, the intermediate film product prepared with the silicone fluid sock was excellently adapted, without requirement for washing or any other surface treatment, to be printed with printing inks or laminated with other resinous layers, such as polyethylene, and so forth.

Commensurate results were obtained when the foregoing procedure was duplicated excepting to employ as the material in the silicone fluid sock a dimethyl siloxane polymer having viscosity at 25° C. of about 30 centistokes and when the general procedure was duplicated with either of the silicone fluids using tube dies having diameters up to and including 6 inches in the preparation of the same and thicker gauge Saran film products. Equivalent excellent results are also achieved when other normally liquid silicone fluids within the above-indicated scope are employed in the sock utilized during the tubulation procedure for the initial film preparation prior to the final coating, as well as for preparation of films (to be ultimately coated) from other film-forming thermoplastic resinous materials including, for example, polyvinylchloride, copolymers of vinyl chloride and vinyl acetate, chlorinated polyethylene and so forth.

In contrast, when the above-described specific procedure was run in the conventional manner wherein, instead of a silicone fluid, the sock that was utilized was a mixture of about 5 parts by weight of water with about 1 part by weight of a refined, U.S.P. grade mineral oil, it was found necesary to wash the film product with an aqueous solution of a synthetic detergent prior to the shrinking step after slitting in order to remove residual oil from the surface. A small quantity of mineral oil consistently adhered as a residue on the surface of the manufactured Saran film causing erratic and dissatisfactory results when the film was attempted to be metallized with aluminum. The metallized film having the mineral oil residue thereon displayed an unsightly alligator pattern and the aluminum coating was found to be disadvantageously rough and deposited in a far-from-smooth pattern. Furthermore, it was impossible to metallize the mineral oil-contaminated Saran film product through the meallizer any more than four-fifths as rapidly as the above-described film product prepared by practice of the present invention using the silicone fluid sock during the tubulation procedure.

Event when the mineral oil was washed from the surface of the conventionally prepared film after the slitting and prior to the shrinking operation, inferior results were obtained in the metallizing operation as compared to those realized using film prepared by a process following the practice of the present invention, primarily due to the undesirable influence of the trace quantities of moisture on the washed film in the high vacuum metallizing apparatus. Furthermore, the water washing step of the mineral oil-contaminated film caused the process to become complicated and operated at a reduced rate of manufacture due to the difficulty of completely integrating the washing step with the other necessary manipulations in the process, including shrinking and splicing.

The scope and purview of the present invention is to be gauged in the light of the hereto appended claims rather than strictly from the foregoing illustrative description and specification.

What is claimed is:

1. A process consisting essentially of the steps of (1) extruding a plastic film from a thermoplastic resinous film-forming cholorethylene material by a procedure wherein said film-forming composition is extruded downwardly through a tube die into a temperature regulating bath wherein the tube is flattened prior to subsequent operations thereon while a column of liquid is maintained within the freshly extruded tube prior to its flattening; wherein the liquid in said liquid column consists of a silicone fluid that is liquid at the temperature of operation of the column and is a polymeric substance comprised of repeating units of the general unit structure:

$$R_n SiO_{\frac{4-n}{2}}$$

wherein R is selected from the group consisting of monovalent aromatic hydrocarbon radicals containing between 6 and about 10 carbon atoms, monovalent halogenated hydrocarbon radicals containing between 6 and about 10 carbon atoms, monovalent aliphatic hydrocarbon radicals containing between 1 and about 8 carbon atoms, monovalent aliphatic halogenated hydrocarbon radicals containing between 1 and about 8 carbon atoms and mixtures thereof, and $n$ has a numerical value between about 1.95 and about 2.2; (2) slitting the so formed tubular film and (3) coating the surface of said plastic film that faced inwardly during the tube forming step and was in contact with said silicone fluid.

2. The process of claim 1, wherein said silicone fluid has a viscosity at 25° C. between about 5 and about 100 centistokes.

3. The process of claim 1, wherein said silicone fluid has a viscosity at 25° C. between about 10 and about 50 centistokes.

4. The process of claim 1, wherein said silicone fluid is a copolymer of phenyl methyl siloxane units and dimethyl siloxane units containing between about 20 and about 70 mole percent of the former copolymerized with the latter.

5. The process of claim 1, wherein said silicone fluid is a copolymer of about equimolar proportions of phenyl methyl siloxane units and dimethyl siloxane units.

6. The process of claim 1, wherein said silicone fluid is a polymer of polymerized diethyl siloxane units.

7. The process of claim 1, wherein said silicone fluid is a polymer of polymerized dimethyl siloxane units.

8. The process of claim 1, wherein said film tube comprises a normally crystalline polymer of vinylidene chloride.

9. The process of claim 1, wherein said coating is applied by vacuum metallizing.

10. The process of claim 9, wherein aluminum is the metal deposited on the plastic film surface.

References Cited by the Examiner

UNITED STATES PATENTS

| 2,488,571 | 11/1949 | Trull | 18—47.5 |
| 2,665,223 | 1/1954 | Clough et al. | 117—169 XR |
| 2,848,747 | 8/1958 | Dixon | 264—146 |
| 2,870,043 | 1/1959 | Wolinski | 117—47 |

FOREIGN PATENTS 481,025    2/1952    Canada.

OTHER REFERENCES

I.M.S. Advertisement, Silicon Spray Mold Release, Injection Molders Supply Co., 3514 Lee Rd., Cleveland, Ohio, September 1954.

I.M.S. Advertisement I, "Read Why It's Better for Your Molds—IMS Silicone Spray Mold Release," No. 20M 9–54, Injection Molders Supply Co., 3514 Lee Road, Cleveland 20, Ohio, September 1954.

I.M.S. Advertisement II, "To Cover All Molding Conditions, IMS Pure Silicone Spray Mold Release, IMS Zinc Stearate Dry Spray Mold Duster," Injection Molders Supply Co., 3514 Lee Road, Cleveland 20, Ohio.

ROBERT F. WHITE, *Primary Examiner.*

S. A. HELLER, *Assistant Examiner.*